United States Patent

[11] 3,593,952

| [72] | Inventor | James Robert Smith<br>Granada Hills, Calif. |
|---|---|---|
| [21] | Appl. No. | 876,343 |
| [22] | Filed | Nov. 13, 1969 |
| [45] | Patented | July 20, 1971 |
| [73] | Assignee | Dynapower Systems Corporation of<br>California<br>Santa Monica, Calif. |

[54] SPRING BIASED SUPPORT FOR
ELECTROTHERAPEUTIC APPARATUS
ARTICULATED ARM STRUCTURE
8 Claims, 6 Drawing Figs.

[52] U.S. Cl. ............................................ 248/284,
287/14
[51] Int. Cl. ............................................ F16l 27/00
[50] Field of Search ............................................ 248/276,
278, 280, 284, 292, 324, 326; 287/14

[56] References Cited
UNITED STATES PATENTS
2,395,178  2/1946  Fiori ............................ 248/280

| 2,434,986 | 1/1948 | Bremer | 248/284 X |
| 3,008,259 | 11/1961 | Zornes | 248/284 UX |

FOREIGN PATENTS
909,254  5/1946  France .................. 248/284

Primary Examiner—J. Franklin Foss
Attorney—White and Haefliger

ABSTRACT: An articulated arm structure is supported by a cabinet and supports an electrotherapeutic treatment head; the arm structure includes first and second cup-shaped joint members interconnected to define a horizontal axis of relative rotation; a first torsion spring extends within the members to yieldably resist arm structure articulation while blocking collapse of the arm structure and head when projecting generally horizontally; and there may be third and fourth cup-shaped joint members connected to define another horizontal axis of rotation, and containing a second torsion spring connected to yieldably resist arm structure articulation while blocking collapse of the arm structure and head when projecting generally horizontally.

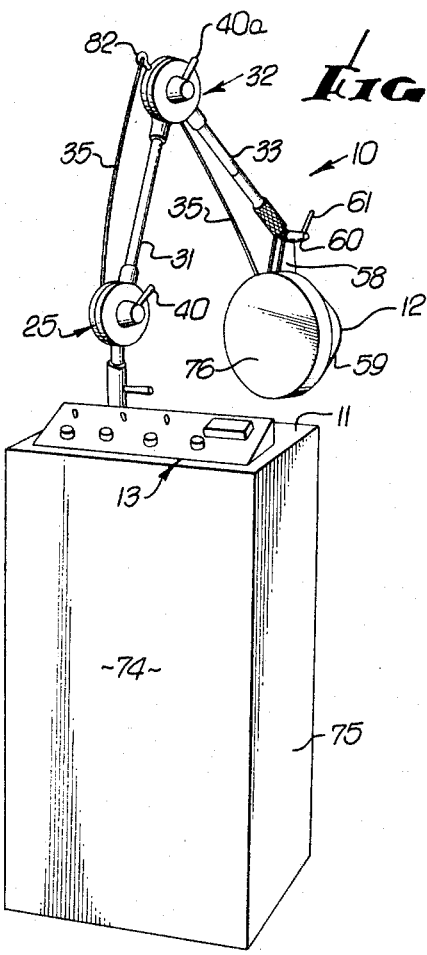
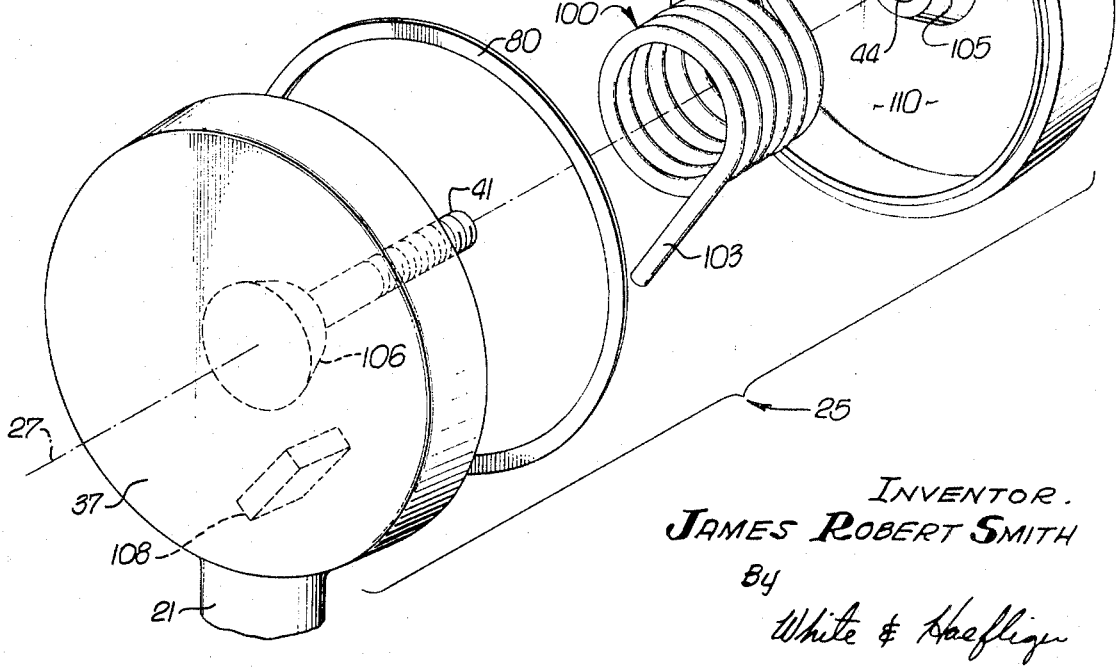

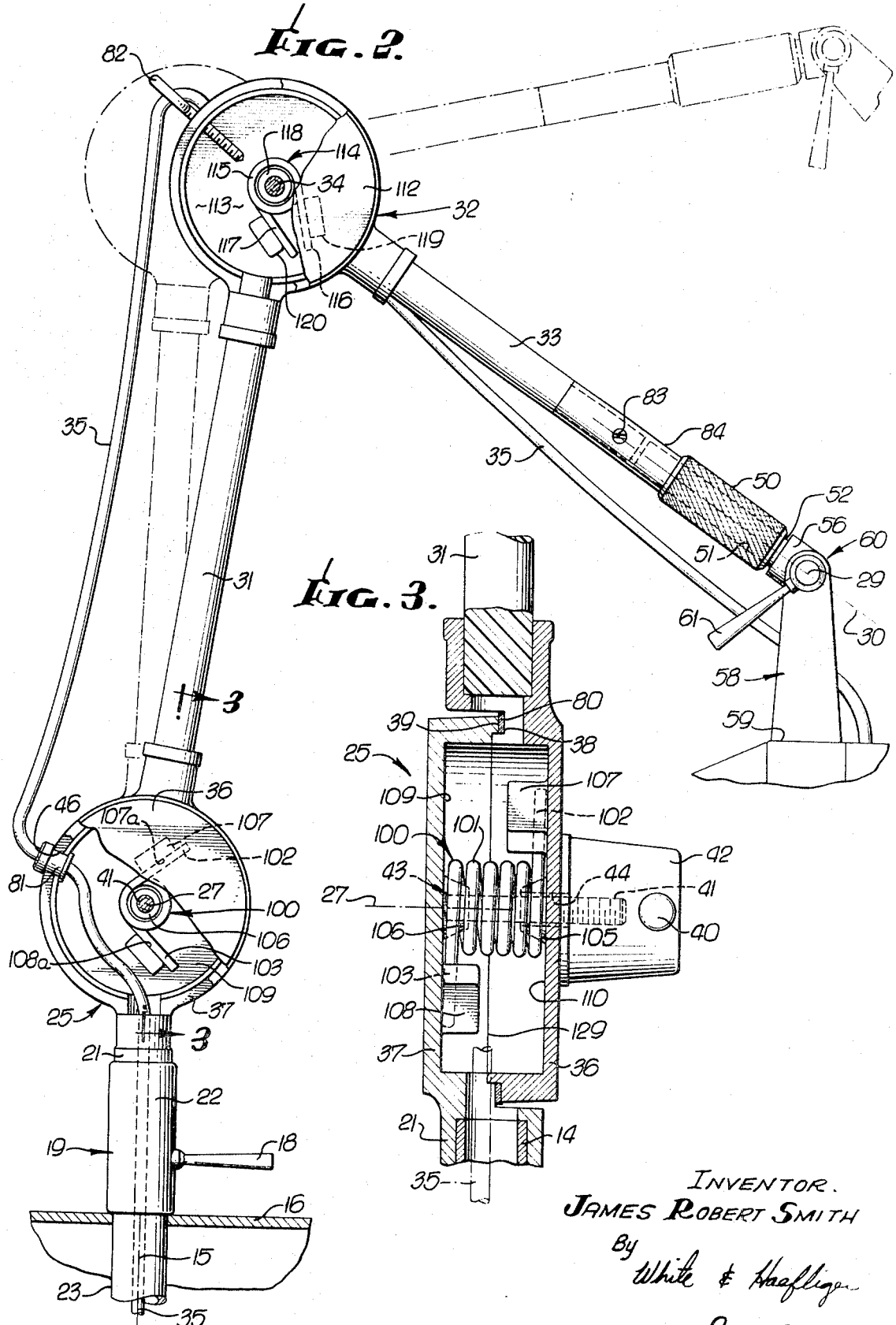

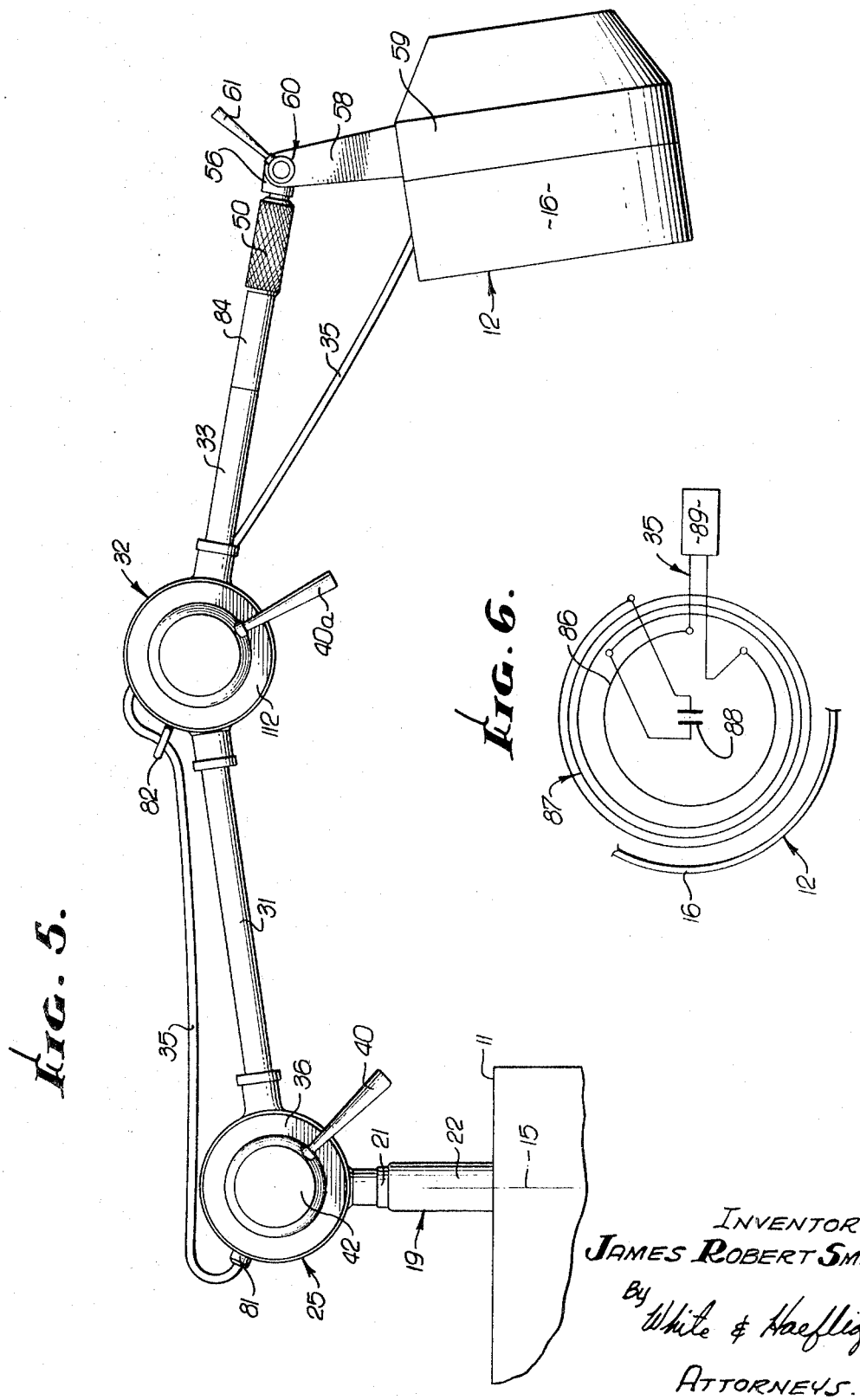

SPRING BIASED SUPPORT FOR ELECTROTHERAPEUTIC APPARATUS ARTICULATED ARM STRUCTURE

BACKGROUND OF THE INVENTION

This invention relates generally to electrotherapeutic equipment, and more particularly concerns improvements in the supporting of a treatment head for easy maneuvering throughout a wide rang of positions, and positive locking in such positions, all with respect to a cabinet containing electrical apparatus from which electrical energy is fed to the head.

In the past, articulated supporting arm structures for electrotherapeutic heads have lacked capacity for ease of maneuverability in joint unlocked condition coupled with provision for positive locking of the arm joints in a wide range of arm positions. This dual capacity is of great advantage to a therapist administering diathermy treatment, for example, since extra consideration need not be given to auxiliary support of the arm structure when the joints are unlocked to free the arm for desired articulation during maneuvering of the treatment head. Further, articulated arm structures in general have lacked desirably simple joint construction providing for positive locking and unlocking of the joint as well as balancing of the joint elements to counteract imposed loads accompanying articulation.

SUMMARY OF THE INVENTION

It is a major object of the invention to provide a solution to the above problems through the provision of an improved articulated arm structure especially adapted for supporting and maneuvering an electrotherapeutic treatment head in relation to a power supply and control cabinet. Basically, the arm structure includes first and second cup-shaped joint members interconnected to define a generally horizontal axis of member relative rotation characterized in that a first mode of arm structure articulation is achieved in response to rotation of the second member relative to the first member about that axis to lower the head, the second member transmitting head weight to the first member; and first torsion spring means extending interiorly of the cup-shaped members and operatively connected thereto to yieldably resist arm structure articulations in head lowering mode, while blocking downward collapse of the arm structure between the members and head when the arm structure projects generally horizontally, the spring means being retained between opposed interior faces of the relatively rotatable members.

Typically, the members have opposed annular surfaces and are interconnected to transmit adjustable clamping force between such surfaces, thereby to lock the members against rotation in any of a series of relative angular positions, the torsion spring means being sized to maintain the arm structure blocked against downward collapse when the clamping force is released. Further, the torsion spring may have windings with end projections which engage lugs on the opposed faces of the relatively rotatable cup-shaped members to transmit torsion from one lug to the other via the spring windings, whereby the springs may be very easily assembled into operative condition by fitting the cup-shaped members together and rotating them to bring the lugs into operative engagement with the spring winding end projections.

Further objects include the provision of third and fourth cup-shaped joint members interconnected to define a second horizontal axis of joint member relative rotation closer to the head then the first and second members, but having a similar construction and incorporating another balancing spring as well as provision for positive locking and unlocking in the same manner as described above.

These and other objects and advantages of the invention, as well as the details of an illustrative embodiment, will be more fully understood from the following detailed description of the drawings, in which:

DRAWING DESCRIPTION

FIG. 1 is an overall view of the arm and head carried by the control cabinet;

FIG. 2 is an enlarged view of a portion of the arm structure;

FIG. 3 is an enlarged view of the primary joint structure, taken in elevation;

FIG. 4 is an exploded perspective view of the FIG. 3 primary joint structure;

FIG. 5 is an elevation showing the articulated arm structure in fully extended position, with joints loosened; and FIG. 6 is a schematic showing of the overall circuit.

DESCRIPTION OF PREFERRED EMBODIMENT

In FIG. 1 the arm assembly 10 is shown in combination with the cabinet top 11 and an electrotherapeutic treatment head 12, the latter being supported by the assembly 10. As is clear from FIG. 1, the controls 13 on the cabinet top may be manipulated for controlling the electrical signal supplied to the head 12, it being seen that a coaxial electrical cable 35 runs between the electrical apparatus contained in the cabinet and to the head while carried by the arm assembly.

Extending the description to FIGS. 2—5, the arm assembly typically includes a post (not shown) typically tubular, which is located at the cabinet top and is pivotable about a vertical axis 15. In particular, the post extends above and below the cabinet top plate 11, and is supported to swing between limiting positions carrying the head 12 from the front of the cabinet as shown in FIG. 1 to either side or to the rear of the cabinet. Since the arm assembly facilitates upward and downward positioning and also swinging of the head 12 as will be more fully brought out, it is clear that the head has a wide range of adjustment positions all with respect to the cabinet from which electrical energy is fed to the head. Accordingly, the patient may be seated at either side of the cabinet or to the front or to the rear thereof for treatment application of the head.

A sleeve 19 supports a post 14 as a result of interengagement of a flange on the post and the upper terminal of the sleeve lower section 23, the sleeve including a tubular cap 22 to retain the flange. The cap is below a flange 21 of joint member 37. Rotating a handle 18 turns the cap relative to the sleeve lower section 23, to which the cap has threaded connection, thereby clamping the flange between the cap 22 and lower section 23, locking the joint member 37 against rotation about axis 15.

What may be generally referred to as primary joint means is carried by the post 14 above the top plate 16, one such joint means being indicated at 25. Attached to the post through the primary joint is what may be referred to as arm section 31, the latter being swingable about a generally horizontal axis 27 at the joint 25.

The arm also includes a secondary joint generally indicated at 32, and a second arm section 33 terminally attached to the first section 31 through the joint 32 and swingable about a second axis 34 generally parallel to the first axis 27. As will further appear, while the arm sections 31 and 33 comprise dielectric shafts such as phenolic resin rods, the joint 25 as well as the post 14 are typically hollow and metallic, for strength.

The two joints 25 and 32 are typically similar in construction, FIG. 4 showing the details thereof as respects joint 25. A pair of coaxial relatively rotatable cup-shaped joint members 36 and 37 are provided, the former being integral with the arm section 31 and the latter being integral with the post 14. The arrangement is such that frictionally interengaged and relatively rotatable shoulders provide frictional resistance to joint member articular or pivoting about the axis 27. Typically, the interengaged shoulders are provided by the rims 38 and 39 of the cup-shaped members which are urged into mutual interfitting proximity with friction ring 80 as illustrated, by adjustable structure provided with a handle 40. Alternatively, rims 38 and 39 may be directly engaged. Typically, such adjustable structure includes a coaxial pin 41 attached to the handle 40 through a cup 42, and threaded at 43 into the member 37. Since the pin extends freely through an opening 44 in the member 36, it is clear that tightening of the handle 40 effects tightening of the shoulders 38 and 39 against ring 80 for positively locking the joint members against relative swinging about the axis 27. The same construction and functioning thereof is found in the joint 32, excepting that in that case one joint member is integral with the arm section 33, whereas the other joint member is integral with the arm section 31. It will be particularly noted that the aforesaid desirable functions are present together with the additional advantage that the electrical cable 35 will extend through the joint 25 and then to the exterior via outlet 81 in cup 37, to preclude binding upon joint member relative rotation. This feature is made possible by providing side opening 46 through the cup-shaped joint member 37 to communicate between the tubular post 14 and the interior of the joint member 25. Also, the cable 35 is carried through eyelet 82 on joint 32 to flex with arm articulation.

Reference is now made to FIGS. 2 and 5 showing terminal joint means having the functions previously referred to. As illustrated, the end of the arm section 33 is received in and attached via setscrew 83 to tubular part 84, the latter being threaded to a tubular plug 50 having a bore 51 receiving a coaxial tubular insert 52. The latter projects into the end of the arm part 84. Insert 52 has a press fit on a tubular member to which U-shaped bracket 56 is connected. When sleeve 50 is rotated and tightened on arm part 84, an annular flange stop is frictionally gripped to hold the head in any selected position of rotation about the axis 30, which position is determined by forcible swinging of the head about the axis. See in this regard U.S. Pat. No. 3,329,149 to Kendall.

The bracket 56 carries another U-shaped bracket 58 in such manner that the latter, to which the head is attached, swings about the axis 29. The head portion or plate attached to the bracket 58 is indicated at 59. Rotary relative adjustment of the U-shaped brackets 56 and 58 to orient the head is facilitated by fastener structure 60 to which a tightening handle 61 is attached.

Referring back to FIG. 1, for orientation purposes it will be understood that the cabinet has front and side panels 74 and 75 respectively. Also the head 12 has a front plate 76 through which therapeutic electromagnetic wave travel is directed.

FIG. 6 illustrates the single turn primary and multiple turn secondary coils 86 and 87, which have a common axis and are inductively coupled within the shell 16 of the head 12. A capacitor 88 within the head shell has plates respectively connected to opposite ends of the secondary coil turns, to provide a tank circuit, and a source of pulsation of frequency 27.12 megacycles is indicated in block form at 89. The coaxial cable is seen at 35.

Coming now to that portion of the assembly with which the invention is especially concerned, what may be referred to as first torsion spring means extends interiorly of the first and second cup-shaped joint members 36 and 37, and is operatively connected thereto to yieldably resist arm structure articulation in a first mode (i.e. arm 31 pivoting downward and clockwise in FIG. 2 to lower the head 12). At the same time, such torsion spring means yieldably blocks downward collapse of the arm structure between joint members 36 and 37 and the head 12 when the arm projects generally horizontally as in FIG. 5, the joint fasteners then being loosened, whereby an attendant may readily and gently shift the arm 31 up or down relative to the cabinet (as permitted by loosened joint 25) to a position best suited to location of head 12 relative to a patient, after which joint 25 may be relocked.

As better seen in FIGS. 2—4, the torsion spring means may advantageously comprise a multiple coil spring 100 having windings 101 extending about axis 27 and wire projections 102 and 103 at opposite ends of the windings and operatively connected to joint members 36 and 37. Note further that the spring 100 is endwise retained between opposed interior faces 109 and 110, and that the members 36 and 37 have integral interior bosses 105 and 106 respectively projecting endwise oppositely into the interior of the spring 100 in centering and stabilizing relation therewith when the cup-shaped sections are assembled together.

FIGS. 2 and 4 illustrate the provision of a lug on each member, as for example lug 107 on member 36 and lug 108 on member 37. Such lugs project generally parallel to axis 27 and toward the plane 129 defined by the interfit proximate the rims 38 and 39. Further, the spring projections 102 and 103 respectively engage the lugs 107 and 108 during flexing of the joint 25, as is clear from FIG. 2, to transmit torsion from one lug to the other via the spring windings, for arm counter balancing purposes. Note that placement and construction of the bosses and spring assures ease of initial closing together assembly of the members 36 and 37, with the spring loosely placed in position on one of the bosses and the arm section 31 extending generally in alignment or counterclockwise to sleeve 22. At such time, the spring is not tensioned, but as the arm section 31 is rotated downward and clockwise in FIG. 2, the spring coils 101 are increasingly tensioned. Note further that the lug 108 is in general axial alignment with sleeve 22 and post 14, and that lug 107 is in general axial alignment with arm section 31. Further, the lugs are oriented so that their elongated sides 107a and 108a flatly engage the spring projections 102 and 103, and the lugs extend inwardly into close proximity to a cylinder defined by the outermost extents of coils 101, all for positive load transmission, as the spring coils are tensioned.

The secondary joint 32 includes third and fourth cup-shaped joint members 112 and 113 interconnected in the same manner as members 36 and 37, so that member 112 is rotatable about horizontal axis 34 relative to member 113 (second mode articulation). Second torsion spring means extends interiorly of the members 112 and 113 and is operatively connected to the latter to yieldably resist such second mode articulation while blocking downward collapse of the arm structure between joint 32 and the head 12 when projecting generally horizontally as in FIG. 5, joint fastener 40a then being loosened so that members 112 and 113 do not appreciably frictionally resist their relative rotation in said second mode. Accordingly, the attendant may easily and gently shift arm 33 up or down relative to the cabinet and to arm 31 (as permitted by loosened joint 32) to a position best suited to location of head 12 relative to a patient, after which joint 32 may be locked. During such shifting, both joints 25 and 32 may be loosened, so that the floating arms 31 and 33 may automatically adjust their relative up and down locations, as by joint pivoting, solely in response to manual guiding of the head to desired positioning after which the joints may both be locked. As will be clear, unlocking of the joints is not followed by collapse of the arm structure, due to floating of the latter afforded by the torsion springs.

The second torsion spring means is similar to the first torsion spring means, but is of less heavy construction due to lesser counterbalancing torque requirements. It includes multiple coil spring 114 having windings 115 extending about axis 34 and wire end projection 116 and 117 at opposite ends of the windings and operatively connected to members 112 and 113. Spring 114 is endwise retained between opposed interior faces of those members, which have integral interior bosses similar to bosses 105 and 106 in FIG. 3. One such spring centering boss is indicated at 118 on member 113.

Lugs 119 and 120 are integral with respective members 112 and 113 and project into the hollow interior thereof in the same manner as lugs 107 and 108 project in FIG. 3. Spring projections 116 and 117 flatly engage the flat faces of the lugs 119 and 120, as shown to transmit torsion therebetween via the windings 115, for arm counterbalancing purposes. Here again, the arrangement and orientation of the lugs facilitates ease and assembly and disassembly of the joint 32 with arm section 33 rotated counterclockwise to arm 31, the spring at such time not being tensioned. When the arm section 33 is rotated downwardly and clockwise, the spring is increasingly tensioned; however, the arm sections 31 and 33 float (i.e. are counterbalanced by the springs) in FIG. 5 position, with advantages disclosed above. Note that lug 119 is in axial alignment with arm section 33, and lug 120 is in axial alignment with arm section 31, it being clear that member 112 is integral with arm section 33 and member 113 is integral with arm section 31. The joint member overall diameters may be about equal, and merely as illustrative may be between 4½ and 5 inches.

When fastener handle 40a rotatably tightened, the joint 32 becomes locked in whatever position members 112 and 113 have assumed, due to member rim frictional engagement with a ring, like ring 80, or rim interengagement, as discussed above in connection with joint 25. Such clamping may be adjusted to provide a desired degree of frictional resistance to joint member relative rotation, accommodating ease of shifting of the counterbalanced arm to a desired position, coupled with arm retention at that position by friction at the joints. When the joints are completely unlocked, the arm will tend to return to FIG. 5 position.

Further, the position of integral lugs 107, 108, 119 and 120 on members 36, 37, 112 and 113 respectively is such that members 36, 37, 112 and 113 can be fabricated from castings which are identical with respect to the position of lugs 107, 108, 119 and 120.

Note in FIG. 2 that cable portion 35a passing through joints 25 is everywhere spaced from the spring and lugs, throughout joint member relative rotation and further joint rotation is not hindered by the cable location.

I claim:

1. In electrotherapeutic apparatus including a cabinet containing electrical power means, a therapeutic treatment head spaced from the cabinet to be bodily maneuvered relative thereto and in relation to a patient, and an electrical connector extending between said power means and head to communicate power to the head, the improvement comprising
    a. articulated arm structure supported by the cabinet and supporting the head, said structure including first and second cup-shaped joint members interconnected to define a generally horizontal axis of member relative rotation characterized in that a first mode of arm structure articulation is achieved in response to rotation of the second member relative to the first member about said axis to lower said head, said second member transmitting weight of the head to said first member,
    b. first torsion spring means extending interiorly of said members and operatively connected thereto to yieldably resist said arm structure articulation in said first mode while blocking downward collapse of arm structure between said members and head when projecting generally horizontally and when said cup-shaped members are otherwise freely relatively rotatable about said horizontal axis, and
    c. said members having spaced inner walls facing axially oppositely and there being integral lugs on the members projecting generally horizontally into such space and away from said opposite walls, said torsion spring means including multiple coil windings extending about said axis and having torsion transmitting projections extending generally away from said axis at opposite ends of the windings and into operative engagement with the respective lugs, the members extending in such axially confining relation to said spring means as to block axial displacement of the projections from the respective lugs.

2. The improvement of claim 1 wherein said members have opposed annular surfaces and are interconnected to transmit adjustable clamping force between said surfaces thereby to lock the members against rotation in any of a series of relative angular positions, said torsion spring means being sized to maintain said arm structure blocked against downward collapse when said clamping force is released.

3. The improvement of claim 1 wherein the members have integral bosses respectively projecting oppositely into the interior of said spring means.

4. The improvement of claim 1 wherein said arm structure includes a rotary clamping element on one of said members and having a handle rotatable to adjust said clamping force.

5. The improvement of claim 1 wherein said electrical connector comprises a cable extending through the interior of at least one of said members and in spaced relation to said torsion spring means.

6. The improvement of claim 1 wherein said arm structure between the first and second joint members and the head includes
    d. third and fourth cup-shaped joint members spaced from said first and second members and interconnected to define a second generally horizontal axis of member relative rotation characterized in that a second mode of arm structure articulation is achieved in response to rotation of the fourth member relative to the third member about said second axis to lower said head, said fourth member transmitting weight of the head to said third member, and said third member being attached to said second member,
    e. second torsion spring means extending interiorly of said third and fourth members and operatively connected thereto to yieldably resist said arm structure articulation in said second mode while blocking downward collapse of outer arm structure between said fourth member and head when projecting generally horizontally and when said third and fourth members are otherwise freely relatively rotatable about said second axis, and
    f. said third and fourth members having spaced inner walls facing axially oppositely and there being integral lugs on the third and fourth members projecting generally horizontally into said space and away from said opposite walls thereof, said second torsion spring means including multiple coil windings extending about said second axis and having torsion transmitting projections extending generally away from said second axis at opposite ends of the windings and into operative engagement with the respective lugs, the third and fourth members extending in such axially confining relation to said second spring means as to block axial displacement of the projections from the respective lugs.

7. The improvement of claim 6 wherein said third and fourth members have opposed annular surfaces and are interconnected to transmit adjustable clamping force between said surfaces thereby to lock the members against rotation in any of a series of selected angular positions, said second torsion spring means being sized to maintain said outer arm structure blocked against downward collapse when said clamping force is released.

8. The improvement of claim 6 wherein said arm structure includes a first arm section connected between the second and third joint members, the lug on the second member having the same angularity about said first axis with respect to said arm section as the lug on the third member has about the second axis with respect to said arm section.